Patented Apr. 30, 1935

1,999,524

UNITED STATES PATENT OFFICE 1,999,524

COMPOSITION OF MATTER FOR EXTERMINATING VERMIN

Tor Gustav Wilhelm Molin, Gottenborg, Sweden

No Drawing. Application March 27, 1931, Serial No. 525,876. In Sweden March 27, 1930

6 Claims. (Cl. 167—13)

As is well known, certain kinds of vermin, as for instance cockroaches and bedbugs, have great inclination for dispersing in buildings from one flat to the others along the piping of central heating plants, where such are installed. With regard to the expansion of said piping due to variations of temperature, it is usual to provide ceiling and wall ducts with bushes or tubes of larger inside diameter than the outside diameter of the lead-in piping, which causes that the vermin make use of the facilities for thoroughfare, offered by the interstice between the said bushes or tubes and the piping.

This invention relates to a composition of matter intended to be applied in the said interstices between the bushes or tubes and the piping, which composition has the property in an effective manner to prevent the vermin from penetrating through the spaces, at the same time as the composition, while maintaining the said property, allows the expansion of the piping due to variations of temperature.

For that purpose the composition of matter consists of a tough, plastic and conveniently sticky (adhesive) mass, the melting point of which to be not below about 70° C., and which contains one or more substances that are poisonous to vermin.

A composition of matter, applied in the interstices in question so that they are totally filled up, will without further mechanical arrangements maintain its place notwithstanding the rise of temperature, which the heating piping may show at certain time, and notwithstanding the movement of the piping relative to the bushes or tubes due to the variations of temperature. At the same time the poison or poisons contained in the composition, will prevent the vermin from eating their way through the mass, or from penetrating the same through eventually existing channels or cavities due to imperfectly filling up the interstices, or to other causes.

Trials have proved, that an especially convenient composition of matter of the said kind can be obtained by consistent grease (hard solid oil) or other kind of grease with a melting point of about 150° C., to which is added calomel (precipitated mercurous chloride, HgCl) or chloralamid (mercurous ammonium chloride, HgNH4Cl) or calcium fluoride, CaF2 in the proportion of about 5 to 10 per cent, or any other kind of poison. The said kind of composition of matter has namely the advantage in course of time not to be subjected to any transformation, conversion or reduction worth mentioning, but during long time to maintain its property of stickiness (adhesion) and toughness.

I do not wish to be limited as to details of the composition as these may be modified in many particular parts without departing from the spirit of my invention.

Having thus described my invention, what I claim and desire to secure by Letters Patent is:

1. A composition of matter intended for preventing vermin from dispersing along the piping of central heating plants and intended to be applied in the interstices between the piping and the bushings or tubes provided in the ceiling and wall ducts of said piping, comprising a mass having a semi-solid consistency at ordinary temperature and a melting point not lower than 70° C., and substantially above the maximum temperature to which the piping is to be subjected, and vermin poison mixed in with said mass.

2. A composition of matter intended for preventing vermin from dispersing along the piping of central heating plants and intended to be applied in the interstices between the piping and the bushings or tubes provided in the ceiling and wall ducts of said piping, comprising a grease having a melting point not lower than 70° C. and substantially above the maximum temperature to which the piping is to be subjected, and vermin poison mixed in with said grease.

3. A composition of matter intended for preventing vermin from dispersing along the piping of central heating plants and intended to be applied in the interstices between the piping and the bushings or tubes provided in the ceiling and wall ducts of said piping, said composition comprising grease having a melting point above the maximum temperature to which the piping is to be subjected, and vermin poison admixed with said grease.

4. A composition of matter intended for preventing vermin from dispersing along the piping of central heating plants and intended to be applied in the interstices between the piping and the bushings or tubes provided in the ceiling and wall ducts of said piping, said composition comprising grease having a melting point substantially above the boiling point of water and above the maximum temperature to which the piping is to be subjected, said grease being admixed with vermin poison.

5. A composition of matter intended for preventing vermin from dispersing along the piping of a central heating system, which piping is subjected to a maximum temperature below 150° C., said composition being applicable in the interstices between the piping and the bushings or tubes provided in the ceiling and wall ducts of said piping, said composition comprising grease having a melting point above the said maximum temperature, said grease being admixed with vermin poison.

6. A composition of matter intended for preventing vermin from dispersing along the piping of central heating plants and intended to be applied in the interstices between the piping and the bushings or tubes provided in the ceiling and wall ducts of said piping, said composition comprising a grease having a melting point of about 150° C. and above the maximum temperature to which the piping is to be subjected, and vermin poison admixed with said grease.

TOR GUSTAV WILHELM MOLIN.